Patented May 8, 1934

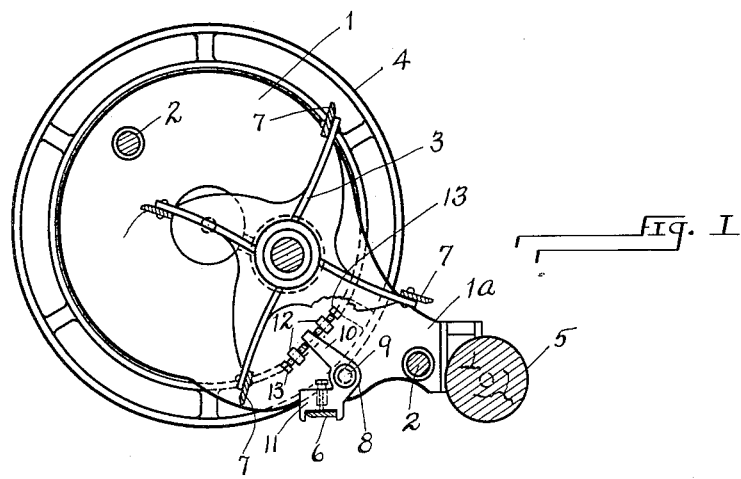
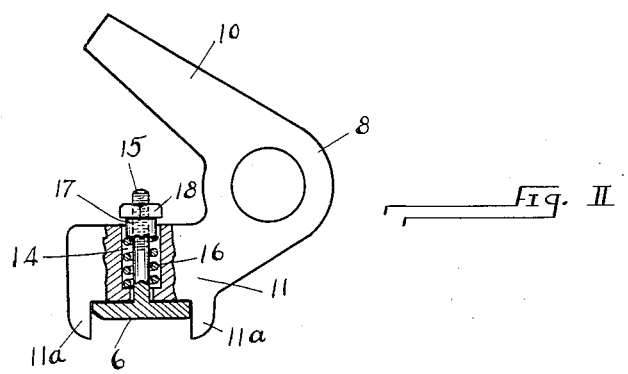
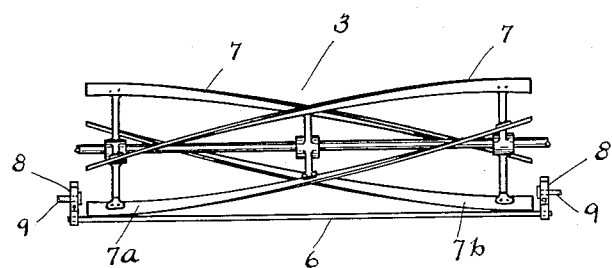

1,957,756

UNITED STATES PATENT OFFICE 1,957,756

MOWER

Lawrence P. Campbell, Sharpsburg, Pa.

Application November 2, 1932, Serial No. 640,821

3 Claims. (Cl. 56—294)

My invention relates to a mower, a structure, that is to say, including a revoluble reel whose cutter blades co-operate with a relatively fixed cutter bar, to shear grain stalks, hay and grass, or the like. In the following specification, I shall describe the invention as it is embodied in a lawn-mower.

The object of my invention is to provide a yielding mounting for the cutter bar of a mower, to the end that the cutter bar shall be resiliently maintained against the cutter blades of the reel, as in service the reel is rotated and its cutter blades are caused successively to sweep over the cutter bar. I am aware that my concept is not broadly new, and may remark that my invention consists in refinements or elaborations in structure which permit each of the opposite ends of the cutter bar to be independently yielding, so that within certain limits the cutter bar, under the influence of the rotating cutter blades, may move inwardly and outwardly of the reel, either in a position parallel to the axis of the reel, or in a position inclined thereto. By means of this flexibility of movement to be found in my structure, contact between the reel blades and the cutter bar is assured throughout the length of each blade, as it sweeps over the bar.

The supports for the opposite ends of the cutter bar are adjustable, and in their positions of adjustment are stationary, or substantially so. Resilient means are included in the adjustable supports for securing the cutter bar thereto. Thus, the supports may be severally adjusted in fixed position relatively to the reel, while the cutter bar is yieldingly movable relatively to the supports in their fixed positions of adjustment. Structure of this nature has proven much superior to any of the mower structures now commonly in use.

In the accompanying drawing Fig. I is a view in vertical cross-section of a lawn-mower embodying my invention; Fig. II is a detail view, to larger scale, showing in side elevation one of the cutter bar supports; and Fig. III is a fragmentary view, showing the mower reel in front elevation, and the cutter bar in association therewith.

The lawn-mower in which my invention is embodied comprises a frame including a pair of opposed side frame members 1 (only one of such frame members appears in Fig. I). The side frame members 1 are secured in spaced, rigid assembly, by means of cross rods 2, and a cutter reel 3 is trunnioned at its opposite ends in such frame members 1. A traction wheel 4 is revolubly mounted in each frame member 1, and the traction wheels are so geared to the reel 3 that, as the mower is moved in service (i. e. moved from right to left, Fig. I), the reel 3 is rotated counterclockwise. A roller 5 is secured to the trailing ends 1a of the frame members 1, and the mower rides over the ground upon the two traction wheels 4 and the roller 5. A cutter bar 6 is secured to mower structure, beneath the reel 3, and immediately above the ground upon which the mower stands. As in service the reel 3 revolves, its cutter blades 7 sweep progressively over the forward edge of the cutter bar 6, and thus the blades and cutter bar cooperate, to produce a continuous shearing effect, whereby the mowing of grass or the like may be effected in known manner.

The problem with which I am concerned—a problem which for years has confronted the art—is how best to organize the cutter bar 6 with the reel 3. As above mentioned, it is essential, to attain best mowing efficiency, that the cutter bar 6 be maintained in contact with each blade 7 throughout its entire length, as in the operation of the mower the blades are caused to advance successively over the cutter bar. To this end, I provide a particularly effective mounting for the cutter bar, and in this mounting my invention will be found.

At each of the opposite ends of the cutter bar, a support 8 is provided, which support is pivotally secured to the adjacent frame 1, by means of a bolt or screw 9. Each support 8 comprises an arm 10, and a body portion or second arm 11. Each side frame 1 is provided with a pair of spaced, outstanding lugs 12, between which the leg 10 of the associated support 8 extends. Screws 13 extend through the lugs 12, the screws extending in opposition to one another, and bearing against opposite sides of the leg 10 of the support. The supports 8 are independently and angularly adjustable about their supporting bolts 9, and the screws 13 serve to secure and fix the supports independently in their positions of adjustment. Accordingly, the cutter bar 6 may be "set" in desired relation to the cutter reel 3, so that in general the blades 7 of the reel will progressively contact the cutter bar during the operation of the mower.

A further and more sensitive or delicate adjustment of the cutter bar is provided for, to co-operate with the adjustable supports 8, insuring the desired contact between the cutter blades 7 and the cutter bar 6. More specifically, resilient means are provided, to secure the opposite ends of the cutter bar to their supports 8. Advantageously, the arm or body 11 of each support 8 is recessed at 14; a threaded stem 15 extends through the recess 14; a compression spring 16 surrounds the stem, and bears against the bottom wall of recess 14; the stem 15 at its lower end is secured to or integrated with the cutter bar, and at its opposite end carries an adjustable sleeve-nut 17 and a lock-nut 18; and the spring is compressed between the sleeve-nut 17 and the bottom of recess 14. Accordingly, it will be understood that the cutter bar is yieldingly mounted in adjustable supports, and, under the influence of the advancing blades 7, the cutter bar is movable inwardly and outwardly, maintaining resilient contact with the several cutter blades 7, throughout their travel over the cutter bar. The body 11 of each support 8 includes legs 11a for laterally supporting and guiding the ends of the cutter bar.

As may be perceived in Fig. II, a clearance is provided between the sleeve-nut 17 and the side wall of recess 14, so that within certain limits a longitudinal tilting of the cutter bar is permitted. It will be manifest that the resilient means for the attachment of the cutter bar to the supports 8 are severally effective, one may yield while the other is substantially stationary, or both may yield together. Thus, the cutter bar may move inwardly and outwardly of the reel 3, either in a position parallel to the axis of the reel, or in a position inclined thereto. This specific freedom of yielding movement to be found in my structure insures the desired continuous contact between the cutter blades and the cutter bar. The adaptability of the cutter bar for tilting from end to end prevents a "high" spot on the edge of one blade from shifting the cutter bar out of contact with the next adjacent blade of the cutter reel. That is, if the left-hand end of the advancing blade 7a (Fig. III) is "high", the whole cutter bar is not shifted radially outward of the reel, but only the left-hand end of the cutter bar is moved outward, so that the cutter bar can remain in contact with the right-hand end of the retreating blade 7b.

In my structure the advantages desired are obtained in largest measure; the structure is of simplified design; it is inexpensive to produce, readily installed, and readily accessible to repair and adjustment.

I claim as my invention:

1. In a mower including a frame, a cutter reel, and a cutter bar adapted to cooperate with such reel, the combination of a support carried by said frame at each of the opposite ends of said cutter bar, said supports being independently and angularly adjustable, means for securing said supports severally in fixed positions of adjustment, and yielding means cooperating with each of said supports for securing the opposite ends of the cutter bar thereto while admitting of the said independent angular adjustment of said supports.

2. In a mower including a frame, a cutter reel, and a cutter bar adapted to cooperate with such reel, the combination of a support carried by said frame at each of the opposite ends of said cutter bar, said supports being independently and angularly adjustable, means for securing said supports severally in fixed positions of adjustment, a stem included with each of said supports for securing the opposite ends of the cutter bar severally thereto, said stems being axially movable, and resilient means cooperating with said stems to admit of the yielding movement of said cutter bar outward of the axis of said reel, and means cooperating with said stems for admitting of the tilting of said cutter bar from end to end, whereby a double automatic adjustment of said cutter bar is afforded as described.

3. In a mower including a frame, a cutter reel, and a cutter bar adapted to cooperate with such reel, the combination of a support carried by said frame at each of the opposite ends of said cutter bar, said supports being independently and angularly adjustable, means for securing said supports severally in fixed positions of adjustment, a stem included with each of said supports for securing the opposite ends of the cutter bar severally thereto, said stems severally being axially movable and angularly, and resilient means cooperating with said stems yieldingly to admit of joint or several movement of the opposite ends of said cutter bar, whereby the cutter bar is yieldingly tiltable from end to end and is adapted also to yield outward of and in parallelism with the axis of said reel under the reaction of the reel blades.

LAWRENCE P. CAMPBELL.